United States Patent [19]
Genser

[11] Patent Number: 5,611,895
[45] Date of Patent: Mar. 18, 1997

[54] ARRANGEMENT FOR REMOVING AND COLLECTING THE DISTILLATE OF ROTARY VACUUM EVAPORATORS

[76] Inventor: Hans-Georg Genser, Bölleinsmühle, 91639 Wolframs-Eschenbach, Germany

[21] Appl. No.: 388,880

[22] Filed: Feb. 15, 1995

[30]  Foreign Application Priority Data

Feb. 23, 1994 [DE] Germany ............... 44 05 717.2

[51] Int. Cl.⁶ ................................................. B01D 3/14
[52] U.S. Cl. .................... 202/182; 202/183; 202/202; 202/238; 203/49
[58] Field of Search ............................ 202/182, 183, 202/202, 238; 203/DIG. 14, 49, 86

[56]  References Cited

U.S. PATENT DOCUMENTS

| | | | |
|---|---|---|---|
| 3,582,473 | 6/1971 | Barnstead | 202/182 |
| 3,794,566 | 2/1974 | Raal | 202/182 |
| 4,035,243 | 7/1977 | Katz et al. | 203/24 |
| 5,409,576 | 4/1995 | Tleimat | 202/174 |

FOREIGN PATENT DOCUMENTS

| | | |
|---|---|---|
| 3522607 | 1/1987 | Germany . |
| 3526644 | 1/1987 | Germany . |

Primary Examiner—Christopher Kim
Attorney, Agent, or Firm—Friedrich Kueffner

[57]  ABSTRACT

An arrangement for discharging and collecting the distillate of rotary vacuum evaporators includes a rotating flask and a line for conducting the distillate from the rotating flask to a cooler for liquefying the distillate. The liquified distillate flows from the cooler into a collector and from the collector into a storage container. A safety check valve constructed as a pressure control valve is provided between the collector and the storage container. An excess pressure producer for increasing the pressure of the distillate is provided between the collector and the pressure control valve, wherein the pressure control valve and the excess pressure producer are constructed so as to interact in such a way that the pressure control valve opens when a sufficient excess pressure of the distillate has been reached.

20 Claims, 4 Drawing Sheets

ARRANGEMENT FOR REMOVING AND COLLECTING THE DISTILLATE OF ROTARY VACUUM EVAPORATORS

BACKGROUND OF THE INVENTION

1. Field of the Invention

The invention relates to an arrangement for removing and collecting the distillate of rotary vacuum evaporators in which the vapor from the rotating flask is conducted to a cooling stretch and is liquified in the cooling stretch; the liquified vapor flows from the cooling stretch into a collector and from the collector into a storage container, wherein a safety check valve is provided between the collector and the storage container.

2. Description of the Related Art

Such an arrangement is known from DE-OS 35 22 607. In that arrangement, for removing the distillate of a vacuum evaporator, the rotary vacuum evaporator must be alternatingly aerated by means of appropriate valves. This causes the arrangement to be complicated with respect to its structural design as well as with respect to its operation. An arrangement which is similar in principle is the subject of DE-OS 35 26 644; in that arrangement, the rotary evaporator no longer has to be aerated for removing the distillate; however, the distillate removal device still has to be aerated. In addition, this arrangement is structurally more complicated because of the necessity of arranging sensors at the storage container and another valve.

SUMMARY OF THE INVENTION

It is the object of the invention to achieve a problem-free removal of the produced distillate even under vacuum with lower structural and operational expenditures as compared to the state of the art.

Starting from the above-mentioned arrangement, the solution of this object is seen initially in that the safety check valve is constructed as a pressure control valve, that an excess pressure producer for increasing the pressure of the distillate is provided between the collector and the pressure control valve, wherein the pressure control valve and the excess pressure producer are adjusted relative to each other in such a way that the pressure control valve opens when a sufficient excess pressure of the distillate is reached. The invention does not require the vacuum pump which is provided at this point in the state of the art; the vacuum pump has the additional disadvantage that solvent vapors escape and must be disposed of. Solvent losses are avoided. Structurally, essentially only the excess pressure producer and the pressure control valve must be provided. In addition to the advantage of reducing the manufacturing costs, the omission of a number of structural elements of the state of the art also results in a more compact arrangement which requires less space. It is also important that the sensors provided according to the state of the art of DE-OS 35 26 644 and the connecting lines of the sensors to the remaining components of the arrangement are avoided. These sensors are sensitive and, thus, have a tendency to malfunction. The sequence of operation is simplified, so that the arrangement is more robust and safer. In addition, the arrangement requires less control means.

In accordance with an embodiment of the invention, the excess pressure producer may be a compression chamber with a compression device for producing the excess pressure. In another embodiment of the invention, the excess pressure producer is a pump. In both cases, a line may be provided which extends as a bypass to the line conducting the distillate from the cooling stretch to the excess pressure producer. In the case of the excess pressure producer, this bypass in the form of a compression chamber serves the function of a pressure compensating line, while in the case of the excess pressure producer in the form of a pump, the bypass serves as an aerating line.

Additional features and further developments of the invention are the subject of the additional dependent claims. In addition, concerning additional features of the invention and the obtained advantages or effects, reference is made to the subsequent description and the corresponding drawing of possible embodiments in accordance with the invention.

DESCRIPTION OF THE PREFERRED EMBODIMENTS

Figure 1:
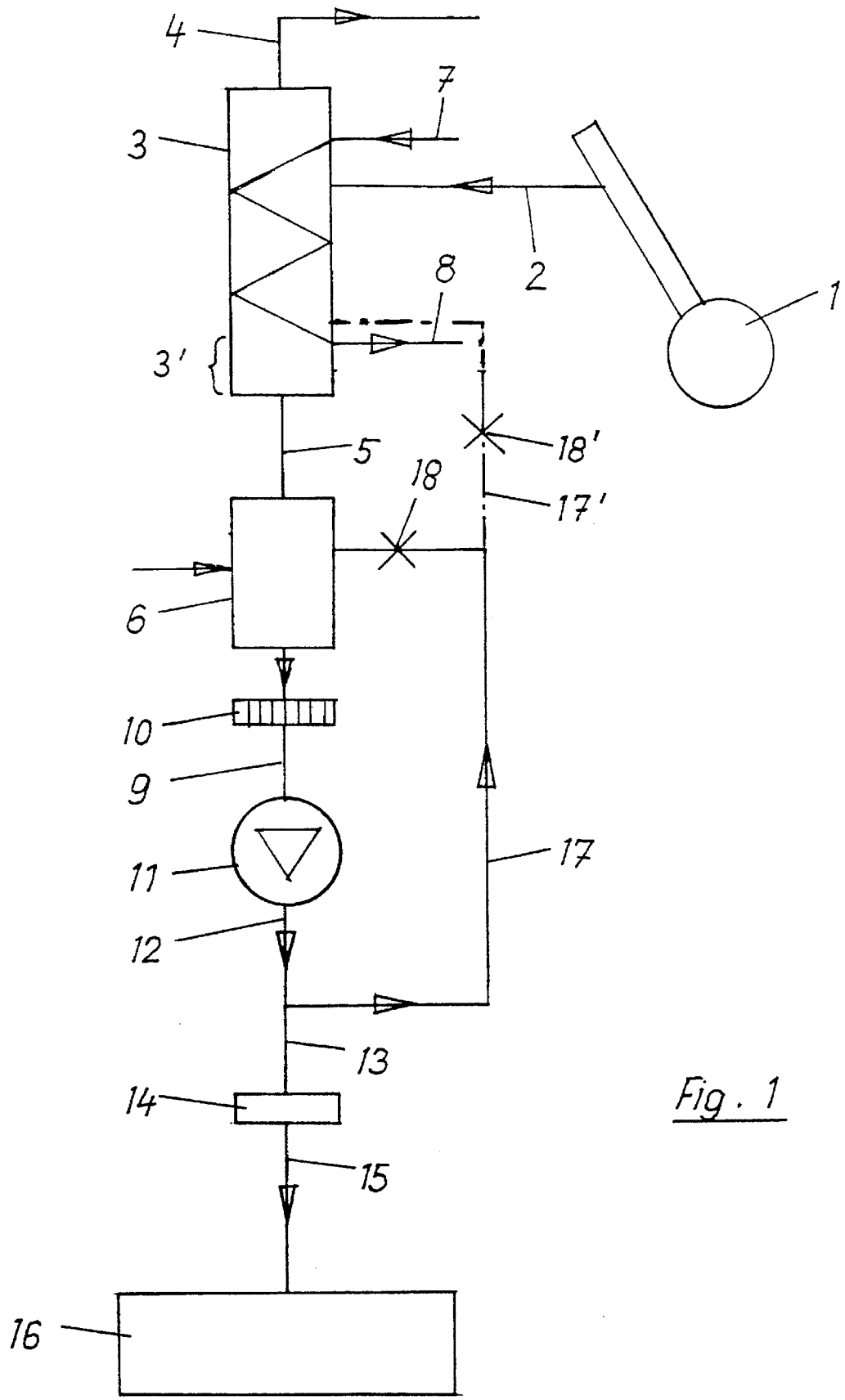
FIG. 1 is an illustration of a first embodiment of the invention.
Figure 2:
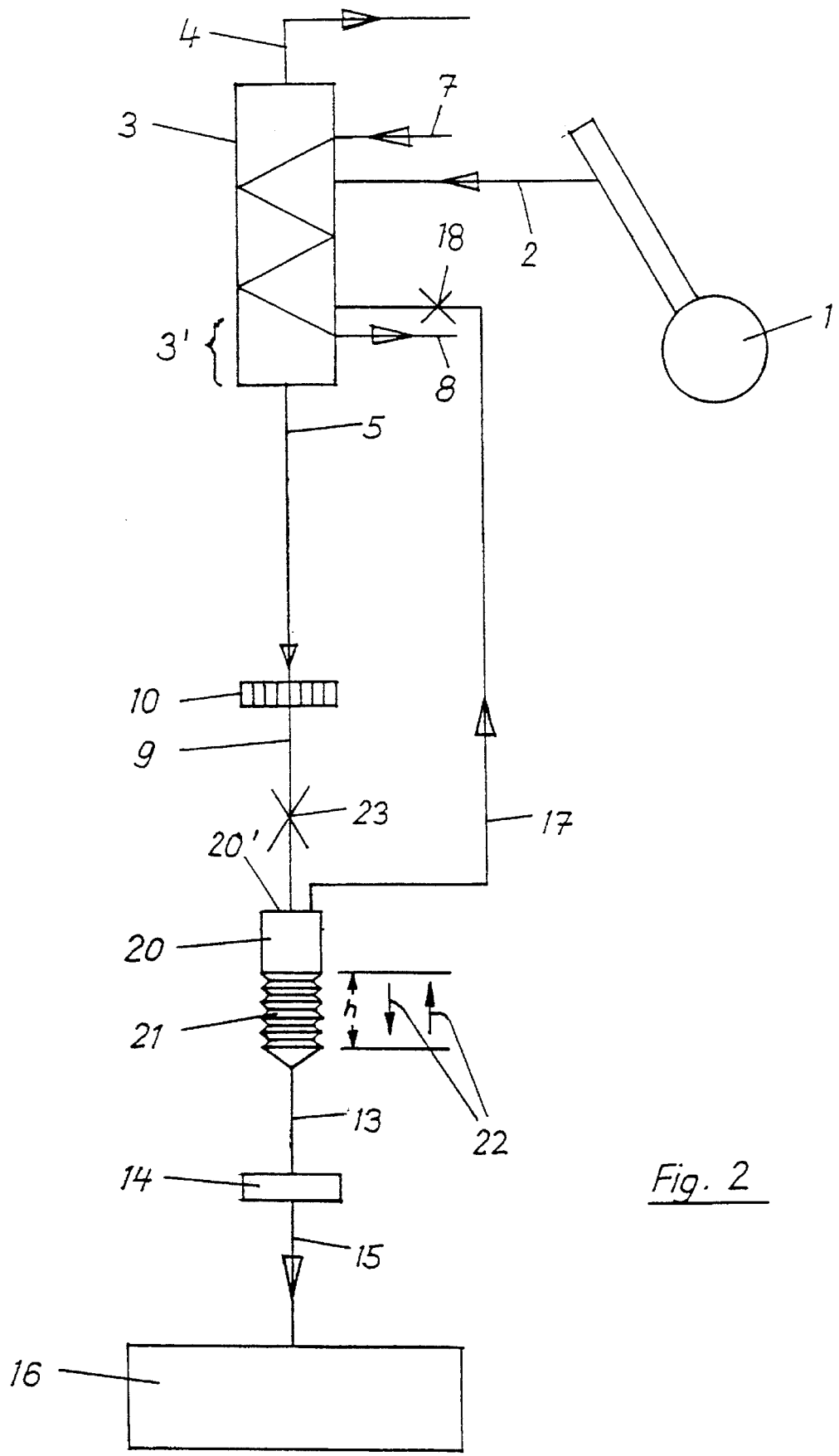
FIG. 2 is an illustration of an embodiment of the invention which is modified as compared to FIG. 1.
Figure 3:
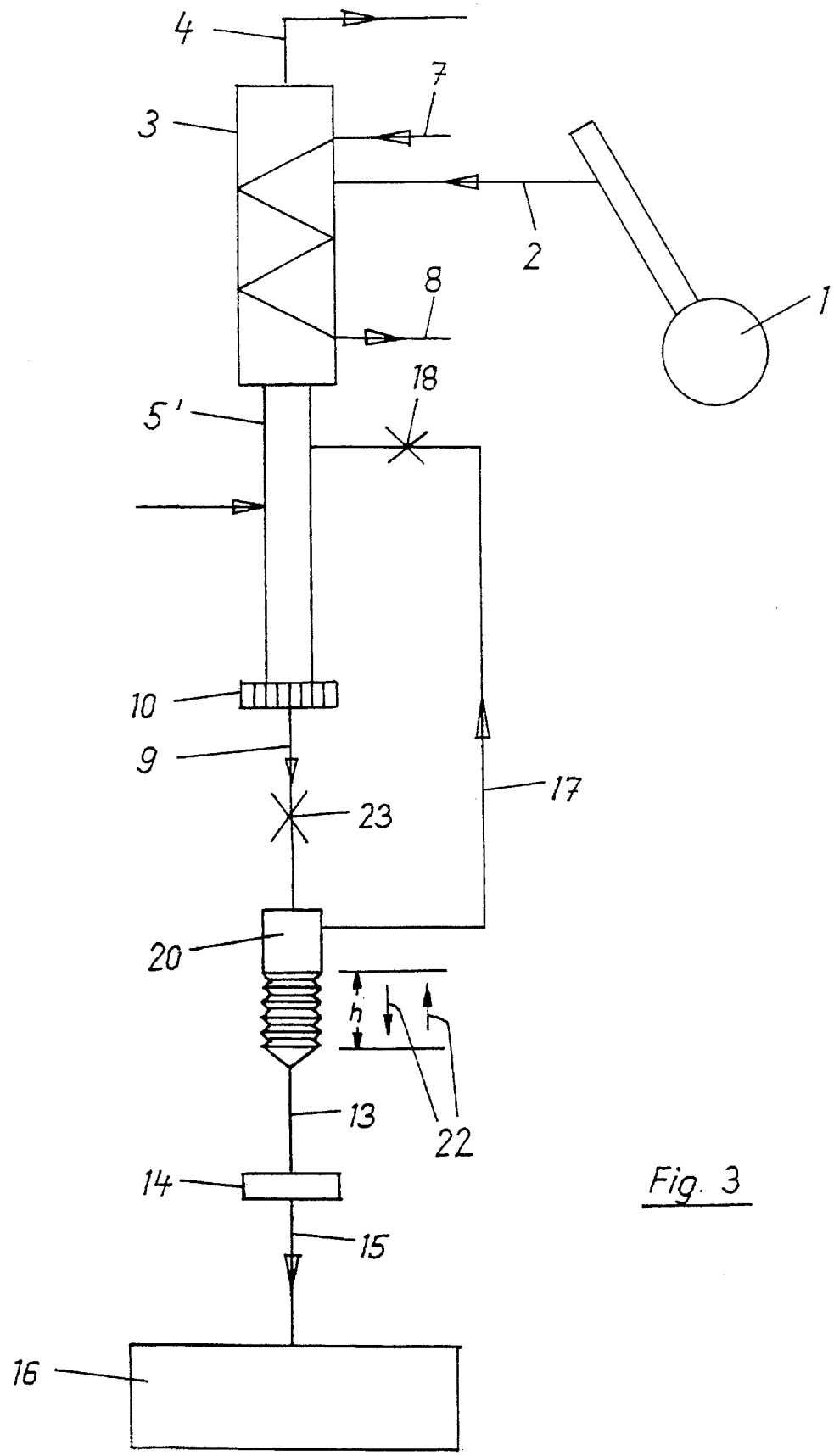
FIG. 3 is an illustration of an embodiment of the invention which is modified as compared to the examples of FIGS. 1 and 2.

The vapor is conducted through a line 2 to a cooler 3 from the rotating flask 1 which is illustrated in FIGS. 1, 2 and 3 only schematically and on a reduced scale. The cooler 3 is provided with a vacuum connection 4, a discharge line 5 to a collector vessel 6 serving for intermediate storage and with the inlet 7 and outlet 8 of the coolant line.

The distillate being collected in the collector vessel 6 flows to an excess pressure producer 11 through the line 9 in which a filter 10 may be provided. In the illustrated embodiment, the excess pressure producer is a pump. The outlet 12 of the pump 11 contains the distillate which is under excess pressure and conducts it through a line 13 to a pressure control valve 14 which on the outlet side extends through a line 15 to the storage container 16 of the distillate, for example, a tank. The outlet side 12 of the pump 11 is additionally connected to the collector vessel 6 through an aerating line 17. Compared to the lines 12, 13, the aerating line 17 has a substantially smaller cross section. This small cross section may extend either over the entire length of the aerating line 17 or may be obtained by an appropriate cross section reducing nozzle 18 which is arranged in the aerating line 17. In the latter case, the remaining cross section of the aerating line 17 does not have to be reduced.

The collector does not have to be formed only by the collector vessel 6 of the illustrated and explained embodiment. The collector could also be formed by the lower portion 3' of the cooling stretch (this variation is indicated in dash-dot lines showing the line 17' and the reducing valve 18') or by a collector line 5' which shall be explained in more detail in connection with the subsequent embodiments of FIGS. 2 and 3. However, the aerating line 17 or 17' must end in a space above the liquid level of the respective collector.

The distillate which flows from the cooler 3 and is being collected is circulated by the pump 11 initially, as indicated by arrows, from the pump outlet 12 through the aerating line 17, the respective collector (in this case the collector vessel 6), the filter 10 and the lines 9 as well as the pump 11 proper; any contained vapor or gas inclusions must be discharged in the collector, wherein the mentioned vapor or gas inclusions contained in this circulation are preferably discharged in the cooling stretch. When a sufficient quantity of distillate has been collected in this circulation—this is usually the case when no more gas or vapor is in the circulation—a sudden pressure increase occurs and, thus, an excess pressure at the outlet of the pump 11, because the reduced cross section of the aerating line 17 or the reducing nozzle 18 holds back the liquid. As a result of the aforementioned cross section difference between the aerating line 17 and the discharge line 12, 13, 15, the pressure control valve 14 opens and a corresponding quantity of collected distillate is discharged to the storage container 16, wherein the pressure control valve is adapted with respect to its response behavior to the pump pressure. For the reasons explained above, the aforementioned aerating line is practical and advantageous. However, it would be possible in principle to provide another aerating device for the removal of the aforementioned gases or vapors.

As a result, the alternating connections of an external excess pressure pump, an also external vacuum pump and the room atmosphere, which are necessary in the state of the art, have become superfluous. Also unnecessary are the sensors which are used in the known arrangements.

In the embodiment of FIG. 2, essential elements and components of the embodiment of FIG. 1 are used and, therefore, are provided with the same reference numerals. In this example, a compression chamber 20 is provided as the excess pressure producer. The compression chamber 20 can be compressed by means of a compression device, particularly a reciprocating lifting device 21. As shown in the drawing, the lifting device 21 may be a bellows which is moved up and down in accordance with arrows 22 by means of an eccentric, not shown in the drawing, or a similar lifting means. A diaphragm can also be provided instead of the bellows. As a result, an appropriate pressure is produced in the compression chamber 20 which is connected to lines 9, 17 and 13. As long as sufficient distillate is not yet contained in the compression chamber 20, the lines 9, 17 and the collection vessel 6, a mixture of distillate and gas or vapor is conducted to the collector through the pressure compensating line 17 and the line 9 (5). The collector may be formed by a collection vessel 6, as illustrated in FIG. 1. In the present embodiment, the collector is formed by the lower portion 3' of the cooling stretch 3. Contrary to the embodiment using a pump 11, shown in FIG. 1, the pressure compensating line 17 is in this case connected to the input side 20' of the compression chamber 20. In this manner, the gas or vapor collecting in the compression chamber above the distillate can be conducted away through the pressure compensating line 17. As a result, it is prevented that a pressurized mixture of gas and vapor is formed in the upper portion of the compression chamber, which would prevent the further flow of the distillate from the line 9. It is also true in this case that the collector may be a different type, as already explained in connection with FIG. 1 and as it results from the embodiment of FIG. 2 and the embodiment of FIG. 3 explained in the following. It must also be ensured that the pressure compensating line 17 leads into a portion of the collector which is located above the liquid level of the distillate. When a sufficient quantity of the distillate has been collected in the compression chamber 20, the pressure of the distillate suddenly increases in the compression chamber 20, so that when the pressure reaches a certain value, the pressure overcomes the counterpressure of the pressure control valve which is adjusted accordingly, the pressure control valve is opened and, thus, a corresponding quantity of distillate can flow through the line 13, the pressure control valve 14 and the additional line 15 into the storage container 16. Also in this case, the cross section of the pressure compensating line 17 is significantly reduced as compared to the cross section of the outlet line 13 leading to the pressure control valve, as explained in detail with respect to FIG. 1. In addition to the reduction of the cross section of the line 17, a corresponding reduction of the cross section of the line 9 is also provided, wherein this reduction in cross section is located between the collector and the input side 20' of the compression chamber 20. Also in this case, either the entire internal cross section of the line 9 may be reduced as compared to the cross section of the line 13, or the reduction in cross section is effected only by a cross section reducing nozzle 23. The cross sections of the lines 9, 17 and of the reducing nozzles 18, 23 are significantly smaller than the cross section of the discharge line 13 of the compression chamber 20 at the outlet side and of the further line 15 to the storage container 16. In the same manner as in the arrangement of FIG. 1, this has the effect that when an appropriate excess pressure is produced in the compression chamber 20, only little distillate can be forced through the lines 9, 17 because of the small cross sections of these lines, so that only little distillate is transported back into the collector vessel. On the other hand, because of the larger cross section of the line 13, a correspondingly large quantity of distillate is conveyed through this line 13 and through the valve 14 and the line 15. This embodiment produces the same advantages and effects as described with respect to the embodiment of FIG. 1.

In the embodiment of FIG. 3, a line 5' between the outlet of the cooling stretch 3 and the inlet of the filter 10 is provided as the collector. The length and diameter of the line 5' are to be dimensioned in such a way that it has a sufficient collection volume for the intermediate storage of the distillate. The pressure compensating line 17 leads into the upper portion of the aforementioned collector. Concerning the operation of this embodiment, reference is made to the explanations of the embodiment of FIG. 2.

In all embodiments of the invention described above, no solvents are lost because the entire distillate, to the extent that it does not remain in the above-described circulations through the lines 17, is conducted into the storage container. As explained, gases or vapors are conducted through the pressure compensating line 17 into a space in the respective collector which is located above the surface of the distillate. In order to be complete, it is pointed out that any required emptying of residues from the entire arrangement can take place after the aeration of the rotary vacuum evaporator under excess pressure.

The pressure control valve simultaneously functions as a check valve because it prevents the entry of atmospheric air when a negative pressure exists in the excess pressure producer or in the collector. The line 15 from the pressure control valve 14 to the storage container 16 and the storage container proper are usually under atmospheric pressure. It is useful if the line 13 from the excess pressure producer to the pressure control valve 14 and the further line 15 to the storage container 16 have approximately the same cross section. This also true for the other embodiments.

The lifting means only schematically illustrated in FIGS. 2, 3 with the directions of movement 22 may be constructed and/or controlled in such a way that the intake stroke which suctions distillate from the line 9 into the compression chamber 20 takes place relatively slowly, while the discharge stroke, i.e., the compression or pressing together of the contents of the compression chamber, takes place comparatively very quickly, preferably abruptly. Both movements described above take place over the stroke distance h, wherein the difference in speeds produces the result that sufficient liquid is introduced into the compression chamber, while the pressure increase of the distillate effected by the abrupt compression opens the pressure control valve 14 abruptly and sufficient quantity of distillate is conducted into the storage container 16. In this embodiment of the invention it is recommended to entirely omit the pressure compensating line 17, so that the abrupt compression does not cause distillate to be forced into the line 17 in a disadvantageous manner and a better intake of the distillate from the line 9 is ensured. In this case, any gas or vapor which may be present can be conducted away during the compression through the line 9, so that a line 17 as a bypass is not necessary for aerating. However, the line 17 could be provided as illustrated, but the line 17 should then have an even further reduced cross section.

The actuation of the compression chamber described above can be achieved with various means, for example, by means of an eccentric or a lifting cylinder arrangement or a similar lifting device.

It should be mentioned that the compression chamber illustrated in examples 2 and 3 may also be differently constructed. For example, the bellows or another displacement means may be arranged in the interior of the compression chamber or may be provided on the side of the compression chamber.

Figure 4:
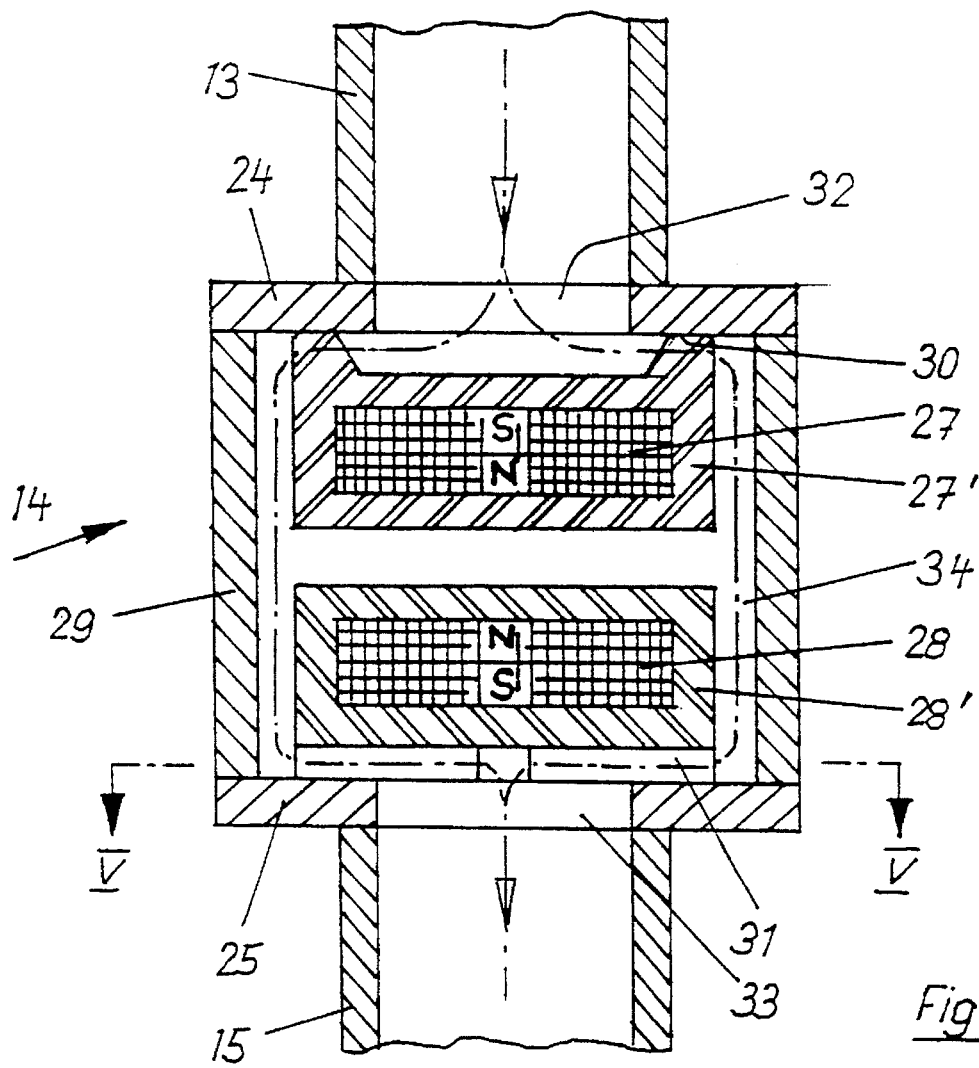
FIG. 4 shows an embodiment of the pressure control valve, shown on an enlarged scale as compared to FIGS. 1, 2 and 3.
Figure 5:
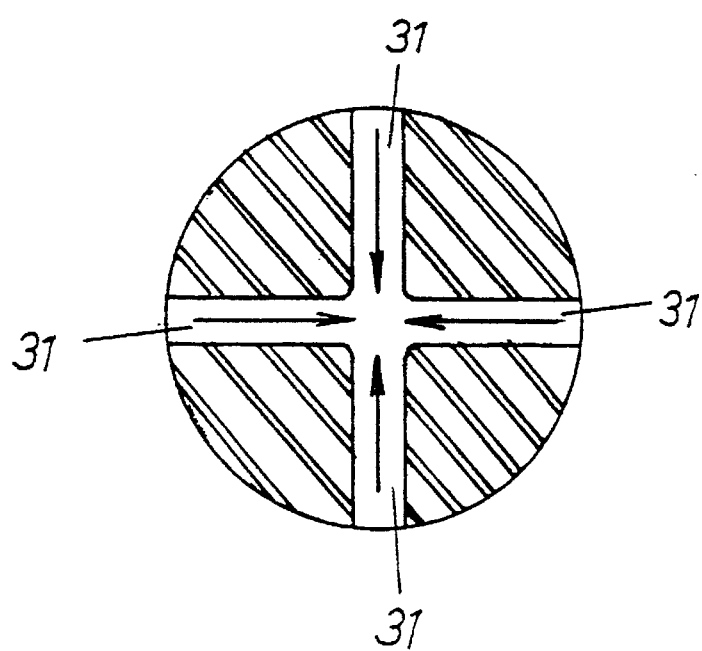
FIG. 5 is an illustration of a sectional view taken along line V—V in FIG. 4.

FIGS. 4, 5 show an embodiment of the pressure control valve and check valve 14. The valve 14 is composed in principle of a housing with plates or covers 24, 25 at the end faces and a cylindrical jacket 29 which tightly and fixedly connects these covers to each other. In addition, a sealing disc is provided at the inlet side of the valve 14 connected to the line 13. The sealing disc is composed of a permanent magnet 27 and a casing 27' surrounding the permanent magnet 27. The casing 27' is of an insulating material, for example, glass or a plastic material, such as the plastic material known under the trade name TEFLON. Another disc is also composed of a permanent magnet 28 with a casing or sheathing 28' and is placed on the cover 25 on the outlet side. The magnets are mounted and the two discs are arranged in such a way that the sides of the discs which are magnetically the same, the north poles N in the drawing, are located adjacent to each other. This results in a magnetic repelling force, which has the result that the lower disc 28, 28' in FIG. 4 is placed on the lower cover 25, while the upper disc 27, 27' rests as a sealing disc with its annular sealing surface 30 against the countersurface of the cover 24. The lower disc 28, 28' has at the bottom side of its casing grooves 31 which are open toward the bottom and toward the circumference. The sealing disc 27, 27' is held in the illustrated sealing contact with the cover 24 not only by means of the magnetic force existing between the two discs which causes the two discs to be repelled, but also in a supporting manner by means of the atmospheric pressure acting on the bottom side of the sealing disc 27, 27' through the line 15, the grooves 31 and the annular gap 34. Accordingly, the excess pressure arriving from the excess pressure producer through the line 13 must be so strong that it overcomes the pressure of the outer atmosphere and also the pressure of the magnetic force against the sealing disc 27, 27'. The dimensions of the structural components of the pressure control valve including the magnetic force are adjusted to the excess pressure producer in such a manner that the pressure imparted from the excess pressure producer to the distillate in the line 13 is so strong that it causes a downward movement of the sealing disc 27, 27' and, thus, an opening of the valve 14. The lower disc 28, 28' rests continuously with its bottom side on the cover 25. If the upper disc 27, 27' is moved downwardly as a result of the above-described excess pressure in the line 13, the distillate can flow, as indicated in dash-dot lines, through an opening 32 in the cover 24, a space above the downwardly displaced disc 27, 27', along a cylindrical annular gap 34 between the discs 27, 27' and 28, 28' and the jacket 29 and finally through the grooves 31 and an opening 33 in the cover 25 into the line 15.

The pressure control valve and check valve 14 is of very simple construction. Returning or restoring springs are avoided. The permanent magnets and their sheathings are robust components which are practically not subject to wear.

All illustrated and described features, as well as combinations thereof, are significant with respect to the invention.

I claim:

1. In an arrangement for discharging and collecting distillate of a rotary vacuum evaporator, the arrangement comprising a rotating flask and a cooler for liquefying the distillate, means for conducting the distillate from the rotating flask to the cooler, means for conducting the distillate from the cooler into a collector and from the collector into a storage container, and a safety check valve provided between the collector and the storage container, the improvement comprising the safety check valve being a pressure control valve, further comprising an excess pressure producer for increasing pressure of the distillate provided between the collector and the pressure control valve, the pressure control valve and the excess pressure producer being configured so as to interact in such a way that the pressure control valve opens when a predetermined excess pressure of the distillate has been reached.

2. The arrangement according to claim 1, wherein the excess pressure producer comprises a compression chamber with a compression pressure device for producing the excess pressure.

3. The arrangement according to claim 2, further comprising means for reciprocating the compression pressure device for producing intake strokes and outlet strokes of the distillate into and out of the compression chamber.

4. The arrangement according to claim 2, wherein the compression chamber comprises a bellows mounted one of outside and inside the compression chamber.

5. The arrangement according to claim 2, wherein the compression chamber comprises a diaphragm mounted one of outside and inside the compression chamber.

6. The arrangement according to claim 3, wherein the means for reciprocating the compression device is configured to produce an outlet stroke which is faster than the inlet stroke.

7. The arrangement according to claim 3, wherein the reciprocating means comprises an eccentric.

8. The arrangement according to claim 7, wherein the eccentric comprises means for time-controlling rotation of the eccentric.

9. The arrangement according to claim 2, comprising a supply line from the collector to an input of the compression chamber, further comprising a pressure compensating line between the inlet of the compression chamber and the collector, the pressure compensating line forming a bypass to the supply line and ending above a liquid level of the distillate in the collector.

10. The arrangement according to claim 9, wherein the collector comprises a collector vessel between the cooler and the excess pressure producer.

11. The arrangement according to claim 1, wherein the cooler has a lower portion, the collector being formed by the lower portion of the cooler.

12. The arrangement according to claim 1, wherein the collector comprises a discharge line from the cooler, and wherein the discharge line has a length and a diameter selected such the collector has a desired collector volume.

13. The arrangement according to claim 10, wherein the excess pressure producer comprises a pump.

14. The arrangement according to claim 13, wherein the pump comprises an outlet connected through an aerating line to one of the cooler and a space above the liquid level of the collector.

15. The arrangement according to claim 9, wherein the supply line from the collector to the excess pressure producer and the pressure compensating line between the excess pressure producer and the collector each have a cross section which is smaller than a cross section of outlet lines leading from the excess pressure producer to the pressure control valve and to the storage container.

16. The arrangement according to claim 9, wherein the pressure compensating line and the supply line from the collector to the inlet of the compression chamber each comprise a cross section reduction nozzle.

17. The arrangement according to claim 2, wherein the compression chamber comprises the collector.

18. The arrangement according to claim 1, wherein the pressure control valve comprises two disks, each disk having a permanent magnet, wherein the disks are mounted such that magnetically equivalent poles of the permanent magnets are located opposite each other, so that a repelling force of the permanent magnets results in a sealing contact of one of the disks at an inlet of the pressure control valve.

19. The arrangement according to claim 18, wherein a gap for allowing distillate to pass therethrough is defined between outer surfaces of the disks and a housing component of the pressure control valve, one of the disks at the inlet of the pressure control valve being configured to be moved away from the inlet by a flow of the distillate into the pressure control valve, and wherein another of the disks at an outlet of the pressure control valve has passages for allowing the distillate to flow to the outlet.

20. The arrangement according to claim 18, further comprising a sheathing each for the permanent magnets of the disks.

\* \* \* \* \*